Patented Dec. 4, 1934

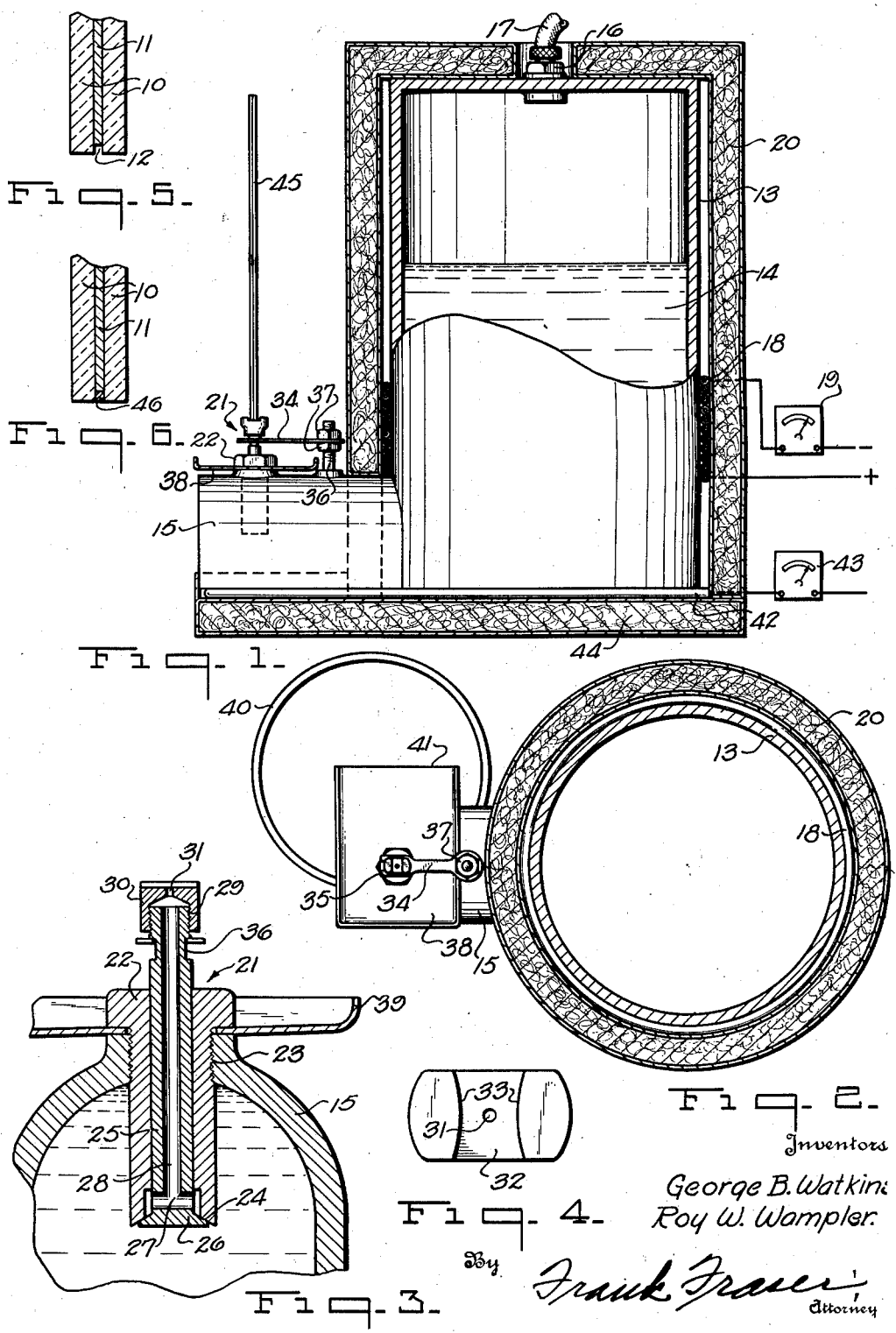

1,983,156

UNITED STATES PATENT OFFICE 1,983,156

APPARATUS FOR SEALING LAMINATED GLASS

George B. Watkins and Roy W. Wampler, Toledo, Ohio, assignors to Libbey-Owens-Ford Glass Company, Toledo, Ohio, a corporation of Ohio Application November 21, 1929, Serial No. 408,874

4 Claims. (Cl. 49—81)

The present invention relates to an improved process and apparatus for sealing laminated glass.

The expression "laminated glass" is used to designate a composite structure consisting of two or more sheets of glass and one or more non-brittle membranes bonded together. There are numerous processes that can be followed in the production of laminated glass and also various materials that can be used. The present invention is in no way limited to any particular manner of producing the laminated glass or materials used.

To protect the bond between the laminations and possibly the material interposed between the glass sheets, it is sometimes considered desirable to seal or lute the edges of the laminated glass. This invention relates to a type of seal that is arranged in a suitable channel extending around the marginal portions of the laminated sheet.

An important object of the invention is to provide an improved process and apparatus for sealing laminated glass without the introduction of mechanical means in the channel adapted to receive the sealing material.

A further object of the invention is to provide such a process and apparatus wherein the sealing material is fed into the channel under pressure in a manner that the entire channel will be supplied with the desired sealing material.

Other objects and advantages of the invention will become more apparent during the course of the following description when taken in connection with the accompanying drawing.

In the drawing wherein like numerals are employed to designate like parts throughout the same, Fig. 1 is a side elevation of the apparatus, partly in section, Fig. 2 is a plan view thereof, partly in section, Fig. 3 is an enlarged vertical sectional detail through a portion of the apparatus, Fig. 4 is a plan view of a form of nozzle that can be used, Fig. 5 is a fragmentary sectional view of a laminated sheet prior to the introduction of the sealing material, and Fig. 6 is a similar view of the sheet after it has been sealed.

Referring to Fig. 5, it will be seen that the laminated sheet consists of two sheets of glass 10 and an interposed non-brittle membrane 11. As has been set forth above, numerous processes can be followed out in the production of the laminated sheet. By way of explanation, it may be pointed out that a pyroxylin plastic is commonly used as the non-brittle membrane and this can be joined to the glass sheets by the use of any suitable skin coats, cements, bond inducing mediums, etc. It is customary to subject the laminations, when in proper superimposed relation, to the combined action of heat and pressure. After the laminations have been joined together, the marginal portions of the non-brittle membrane 11 are removed to form the channel 12. This invention is not limited to any particular way of forming the channel 12.

Referring to Fig. 1, the numeral 13 designates a receptacle adapted to contain a suitable sealing material 14. The sealing medium may be some weather-proof material such as pitch or the like. The receptacle 13 is provided with a spout or extension 15 connected to the lower end thereof as is clearly illustrated. The top of the receptacle 13 is provided with an opening 16 to which may be connected a hose 17. The sealing material may be introduced into the receptacle by removing the hose and passing said material through the opening 16. The hose 17 may then be replaced and connected to a suitable source of air pressure supply. To control the temperature of the sealing material, heating elements 18 may be arranged around the receptacle and controlled by means of a rheostat 19. It is also preferred that an insulated housing or covering 20 be provided as illustrated.

Extending vertically from the extension or spout 15 is a valve arrangement designated in its entirety by the numeral 21. The valve arrangement is illustrated in detail in Fig. 3, and it will be seen that it consists of a tubular member 22 screw-threaded at 23 into the extension 15. The lower end of the tubular member 22 is formed into a valve seat 24. Extending through the tubular member is a sleeve 25 carrying a valve head 26 at one end adapted to be received within the seat 24. Extending transversely of the sleeve is an opening 27 communicating with the vertically disposed bore 28 in the sleeve.

The upper end of the sleeve 25 is screw-threaded as at 29 and is adapted to receive the nozzle 30 provided with the centrally disposed aperture 31. The nozzle 30 is provided with a recess 32 as disclosed in Fig. 4 formed between the preferably curved shoulders 33.

A flat spring 34, having a bifurcated end 35, is adapted to be received in the reduced portion 36 of the sleeve 25, said spring being carried upon and supported by the upstanding stud 36 on which are carried the nuts 37. The arrangement of the spring 34 is such that the sleeve is normally urged upwardly so that the valve 26 is brought into tight engagement with the seat 24.

Clamped between the head of the tubular member 22 and the extension 15 is a trough 38 provided with the upstanding flanges 39 on three sides. It is preferred that the trough slant downwardly toward the edge not provided with the upstanding flange, and a receptacle 40 is designed to be positioned beneath the end 41 of the trough.

The bottom of the receptacle and extension is also preferably heated by means of the electrical unit 42 controlled by means of the rheostat 43, while an insulated covering 44 is designed to permit efficient heating and temperature control of the receptacle and associated parts.

In operation, the desired sealing material is placed within the receptacle 13 through the opening provided in the top thereof. The receptacle should not be entirely filled as sufficient room should be left to permit the introduction of air under pressure into the upper end of the receptacle. Obviously, if a sufficiently tall receptacle is used to get the desired pressure within the receptacle, it is not necessary to use the air pressure, although we prefer to use a construction such as illustrated.

The heating means is then so controlled that the temperature of the sealing material 14 can be brought to a temperature of between 400 to 425 degrees Fahrenheit, although obviously the temperature will be dependent somewhat upon the character of the sealing material employed. After the sealing material has been brought to the proper temperature to give it the desired fluidity, a sheet of laminated glass 45 may be placed in a substantially vertical position as is illustrated in Fig. 1. The sheet of glass 45 has been previously provided with the channel 12 shown in Fig. 5 along the edge or edges to be sealed. The operator presses the sheet downwardly when it is in the position illustrated on the nozzle. The downward movement of the sheet causes the sleeve 25 to slide downwardly through the tubular member 22, thus moving the valve 26 away from its seat 24. The extension 15, being in open communication with the receptacle 13, permits the sealing material to pass through the opening 27 up through the bore 28 and to be extruded through the aperture 31 into the channel 12 of the laminated sheet. We have found that a pressure of from between five and ten pounds in the tank or receptacle is sufficient to cause the desired extrusion of material, although obviously the invention is in no way limited to the exact pressure employed. The laminated sheet may then be moved horizontally across the nozzle 32 between the shoulders 33, insuring against accidental slipping of the sheet from the nozzle. It has been found that the sheet can be moved fairly rapidly and that the sealing material will be forced into the channel to completely fill the same and to produce a satisfactory seal. When the end of the sheet is reached, it is lifted from the nozzle and the spring 34 will move the sleeve upwardly, thereby bringing the valve head into contact with its seat, and thus cutting off the flow of sealing material.

While it is not essential to the successful carrying out of this invention that the nozzle and associated parts be arranged in a vertical position during the sealing thereof, nevertheless we have found this position to be the most desirable because the amount of sealing material smeared on the faces of the laminated sheet is reduced to a minimum. Any excess material passing through the aperture 31 is caught in the trough 38 and flowed into the receptacle 40. It may be pointed out here that a scraping member can be associated with any part of the apparatus desired to assist in removing any excess sealing material that may be present on the edge of the laminated sheet.

Even though the sealing material is permitted to harden and cause sticking of the valve, upon heating of the receptacle and sealing material, the hardened material will soften and permit proper functioning of the sealing device. It will be noted that the action of the sealing device is controlled by pressure exerted through means of the sheet. Obviously, modifications of the specific type of valve illustrated can be made without avoiding the spirit of this invention. In Fig. 6, the numeral 46 designates the seal formed by following out the above process.

The amount of pressure required to depress the valve mechanism is relatively slight, and it has been found that the amount of breakage caused by the sealing operation is reduced to a minimum. It is obvious that no mechanical means are introduced into the channel when sealing the laminated glass.

We claim:

1. An apparatus for sealing laminated sheet glass, comprising a receptacle adapted to contain the sealing material and being provided with a lateral extension connected to the lower end thereof and in communication therewith for receiving the sealing material therefrom, a vertically disposed valve associated with the lateral extension and having a nozzle upon which the laminated sheet to be sealed is adapted to be supported, said nozzle being provided with a pair of spaced shoulders defining a recess therebetween within which the sheet is received, and being further provided with a restricted outlet opening between the shoulders, means for normally maintaining the valve in closed position, and means associated with said valve to effect the opening thereof when the sheet of laminated glass is pressed downwardly against the nozzle.

2. An apparatus for sealing laminated sheet glass, comprising a receptacle adapted to contain the sealing material and being provided with a lateral extension connected to the lower end thereof and in communication therewith for receiving the sealing material therefrom, a vertically disposed valve associated with the lateral extension and having a nozzle upon which the laminated sheet to be sealed is adapted to be supported, said nozzle having a restricted outlet opening, a spring carried by the lateral extension exteriorly thereof and engaging a portion of said valve for normally maintaining the valve in closed position, means associated with said valve to effect the opening thereof when the sheet of laminated glass is pressed downwardly against the nozzle, and means for preventing slippage of the sheet from the nozzle during the sealing thereof.

3. An apparatus for sealing laminated sheet glass comprising a receptacle adapted to contain the sealing material, a vertically disposed valve associated with the receptacle and having a nozzle upon which the laminated sheet to be sealed is adapted to be supported, said nozzle being provided with a pair of spaced shoulders defining a recess therebetween within which the sheet is received and being further provided with a restricted outlet opening between the shoulders, means for normally maintaining the valve in closed position, and means associated with said valve to effect the opening thereof when the sheet of laminated glass is pressed downwardly against the nozzle.

4. An apparatus for sealing laminated sheet glass comprising a receptacle adapted to contain the sealing material, a vertically disposed valve associated with the receptacle and having a nozzle upon which the laminated sheet to be sealed is adapted to be supported, said nozzle having a restricted outlet opening, means for normally maintaining the valve in closed position, means associated with said valve to effect the opening thereof when the sheet of laminated glass is pressed downwardly against the nozzle, and means for preventing slippage of the sheet from the nozzle during the sealing thereof.

GEORGE B. WATKINS.
ROY W. WAMPLER.